SELECTION SYSTEM
Filed July 31, 1961
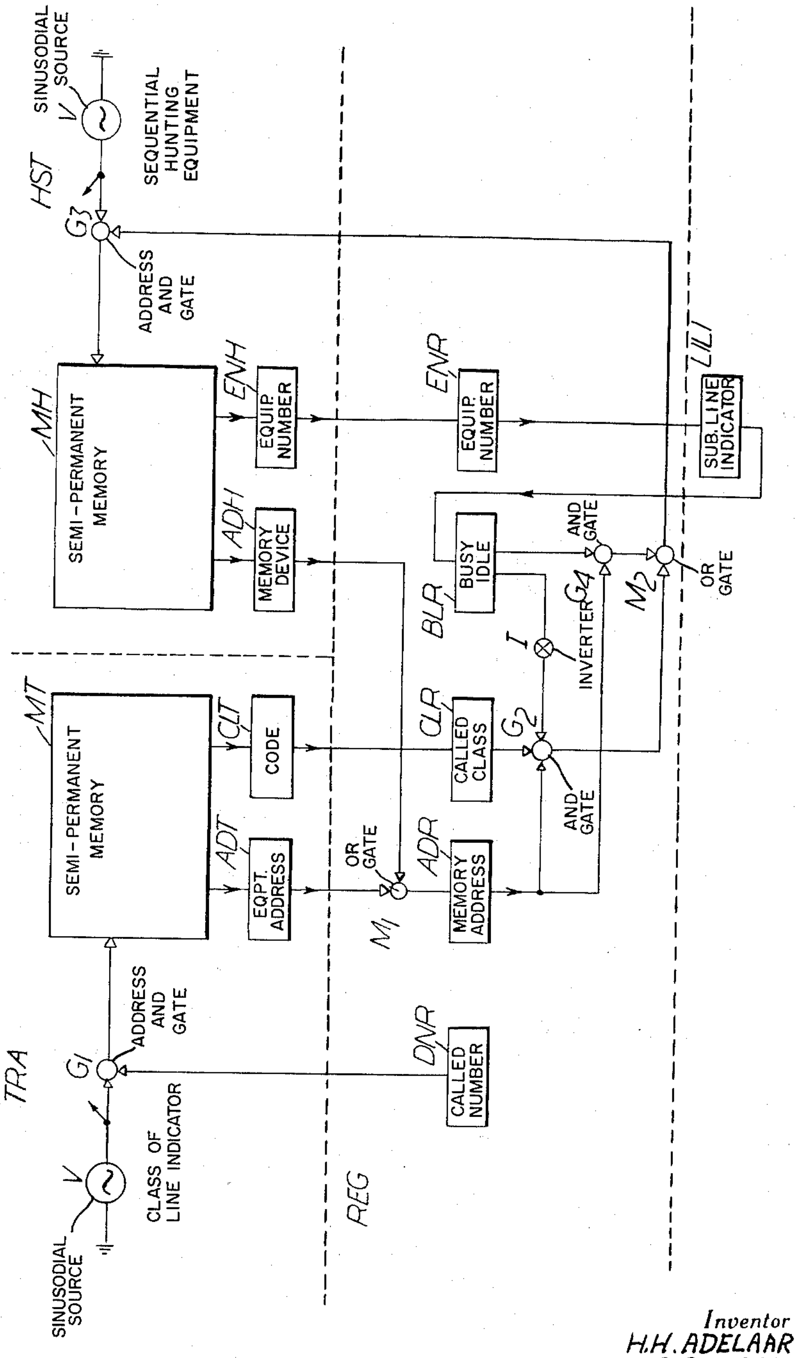
Inventor
H.H. ADELAAR
F. CLEMENS
J. MASURE
By [signature]
Attorney United States Patent Office 3,204,039

Patented Aug. 31, 1965

3,204,039

SELECTION SYSTEM

Hans Helmut Adelaar, Frans Clemens, and Jean Louis Masure, all of Antwerp, Belgium, assignors to International Standard Electric Corporation, New York, N.Y., a corporation of Delaware Filed July 31, 1961, Ser. No. 128,151
Claims priority, application Belgium, Aug. 12, 1960, 39,988, Patent 594,016
6 Claims. (Cl. 179—18)

The invention relates to a selection (or group hunting) system according to which a control equipment hunts for an electrical circuit standing in a given condition among a plurality of such circuits able to stand in said condition. Generally, this hunting is performed in a sequential manner.

Selection systems, of the type described herein, are well known. They may in particular be necessary in telephone systems which hunt for a free junction among a plurality of junctions going to a particular telephone exchange or pertaining to a particular direction. The junction group in which a free junction must be chosen is usually determined by the prefix of the called subscriber's number. Likewise, such a selection system is also required in private branch exchanges for the so-called P.B.X. lines. First, control equipment such as a telephone register determines that a called line is a P.B.X. line. Then, hunting equipment successively examines not only the first line of the P.B.X. group, but (if busy conditions are found) all lines of the P.B.X. group etc. Busy tone is sent back to the calling subscriber only if all the lines of the group are busy.

Such selection systems, and particularly when the hunting is made in a sequential manner, generally imply a search cycle during which a predetermined number of circuits or lines will be scanned. During the scan it will be determined whether the circuits or lines which possess the characteristic of the wanted group or direction, are free or busy. The identity of the circuit or of the line pertaining to the group is registered by the control equipment as soon as a free line is found.

The above described systems are well known. The sequential search may be performed with the help of a rotating switch wiping over one or more series of terminals in which certain terminals are characterized as pertaining to the required group. A supplementary characteristic (such as a grounded sleeve, for example) is provided to also define the state of the line, i.e. busy or not. Such systems have also been constructed from electronic circuits, the electro-mechanical finders being replaced by scanning devices using electronic gates. Such an electronic system for sequential hunting a free P.B.X. line is described, e.g. in U.S. Patent 2,667,540 (M. Den Hertog—C. De Zeeuw).

One disadvantage of these prior art systems is that it is necessary to scan not only the group of lines or circuits in which a free circuit or line is offered, but also a larger assembly of circuits or lines which includes the desired group. In other words, for a given scanning speed, the scanning time is not proportional to the number of lines of the desired group but in fact, to a larger number of lines which are those constituting the complete scanned assembly. Only the lines of the desired group will of course be effectively examined since the other lines will not respond to the desired characteristic. But it remains nevertheless that as the assembly of lines becomes larger, e.g. when it includes several groups of such lines, the hunting time increases for a given scanning speed. In these circumstances it is generally difficult to foresee very large line assemblies, but this implies that line changes, e.g. an increase of the lines of a P.B.X. group following an increase of the traffic will give rise to difficulties or limitations, since one may not re-distribute lines outside an assembly of lines with a limited capacity.

In other words, a connector usually hunts over all P.B.X. lines when a single "Pilot" or P.B.X. number is dialed. It is generally not possible, when using the principle of the pilot selection number for a P.B.X. group, to distribute the different lines of this group in an absolutely arbitrary manner inside a telephone exchange. With electronic circuitry, one is no longer limited, as in general, for electro-mechanical systems, in using consecutive lines for a P.B.X. group. However, the repartition of the lines of a same P.B.X. group characterized by a pilot number can only be made inside a rather limited assembly of lines, e.g. 100. But, it is very desirable to be able to dispose of a flexible arrangement, particularly in the case of P.B.X. groups where the increase of traffic may take very sizable proportions in a short time.

A general object of the invention is to realize a selection system with sequential hunting and where the maximum search time for a free circuit in a given group is uniquely function, for a predetermined search speed, of the number of circuits included in the said group.

In accordance with a first characteristic of the invention, a selection system as initially defined is characterized by the fact that it comprises a temporary or preferably a semi-permanent memory to which the control equipment has access. The memory is of the sequential access type so that the control equipment may address it with the help of a first code characterizing the identity of a circuit out of a predetermined group. In response to this address, the memory provides a second code characterizing the second circuit of the required group and so on. The control equipment is thus able to successively examine the state of the different circuits of the required group between the various addresses of said memory, until a circuit in the desired condition, e.g. free, is reached.

It is seen that with such a system, for a given hunting speed, i.e. a predetermined period between each address of the memory, the hunting time is far less than in the prior systems since the memory automatically limits the search to circuits in the desired group. Morevoer, if said memory is semi-permanent, it will be possible each time the need arises to modify the capacity of the groups and to introduce new groups since it is only necessary to modify the codes provided by the memory in response to a given address. Such a semi-permanent memory will be able to contain information pertaining to numerous groups and in particular to all the P.B.X. groups of a large telephone exchange such as a 10,000 line exchange.

Advantageously, such a semi-permanent memory will be realized in the form of a memory where the information is stored in an essentially mechanical fashion with the help of capacitive couplings between input wires and output wires, this memory being the object of a co-pending U.S. application S.N. 845,362, filed October 9, 1959 (J. Van Goethem). In such a memory, removable strips are provided for each input conductor corresponding to an address and the presence or absence of electrodes placed on these strips establishes or does not establish a capacitive coupling between this input conductor and the various output conductors. In this manner, a signal, e.g. a sinusoidal voltage reaching an input wire when said memory is addressed will give rise to a combination of signals appearing on certain of the output wires, this combination thus providing the code corresponding to the address. The replacement of such a strip or of a combination of strips permits for each address to easily modify the corresponding code. Thus, it is seen that such a memory in a way contains a plurality of search programs, the number of programs corresponding to the number of groups of circuits, e.g. groups of telephone lines corresponding to private branch exchanges.

Another object of the invention is to facilitate the search for circuits and more particularly lines in the case of a telephone exchange.

In accordance with another characteristic of the invention, a selection system is characterized by control equipment such as a telephone exchange register which has access to a class of line indicator. This indicator is able to receive from said register the selection number of a called line and in response provide to the said register an indication that the corresponding line is part of a group of lines of which one or the other may be selected. This indication provided by the indicator is accompanied by an address code which causes a read out of a second address from said memory to provide the sequential hunting.

In accordance with another characteristic of the invention, said memory serving for the sequential hunting simultaneously provides with a new address, the identity of a line or of a circuit in the group in which the search is performed. The control equipment uses this identity to determine the condition of the circuit. Depending upon the circuit condition, e.g. busy circuit, the control equipment may read out a new address of said memory serving for the sequential hunting.

In accordance with yet another characteristic of the invention, said control equipment is constituted by a multiple telephone register of the type comprising a register memory with sequential access cooperating with register devices for storing data pertaining to the condition of a call path herein called a "statistical data storage device." These registers operate, in such a way that each compartment of said register memory constitutes an individual register. The word stored in each compartment characterizes the progress of the routing or of the interruption of a communication path. Each word, which pertains to the storage of statistical data about a given communication path, is regularly stored in said devices. These words offer access to said memory serving to the sequential hunting during each statistical data storage time.

In accordance with yet another characteristic of the invention, the statistical data storage devices of the multiple register may also have access to said class of line indicator.

The system described above is particularly advantageous for a communication system and more particularly an electronic exchange using time division multiplex junctions or highways to transmit the conversations and control equipments of the type described in the co-pending U.S. application S.N. 74,434, filed December 7, 1960, Patents Nos. S.N. 125,128, filed July 19, 1961 (H. Adelaar et al.) and 593,490 (H. Adelaar et al.) According to this system, one or more master control equipments are used. For example, a multiple register and a multiple supervision circuit function in a manner analogous to the multiple register but handle the already established communications. For such multiple register an advantageous solution consists in having a statistical data storage time for each register word which is at least equal to the speech sampling period, e.g. a statistical data storage time of 120 microseconds.

Successive statistical data storage times for a given communication may be used to address during a first statistical data storage time the class of line indication. If the class indication indicates a P.B.X. group, during the following statistical data storage time of the word characterizing the communication, the register will address the associated memory to cause the sequential hunting. If a free line cannot be found the first time, during the statistical data storage time corresponding to the following cycle, the process is repeated until all the lines of the required P.B.X. group have been examined.

For a register traffic of the order of those encountered for a 10,000 lines exchange, the multiple register may comprise 90 rows or compartments, i.e., the equivalent of 90 individual registers. This gives a cycle of $$90 \times 0.12 = 10.8 \text{ milliseconds}$$

In this manner, while benefiting from the advantages of such a multiple register, (that is to say from the time multiplex for the control of comunications and by using a relatively long statistical data storage time of a 120 microseconds, which permits the use of control circuits with relatively low operating frequency), the hunting time for a line out of a group is relatively short. The maximum duration depends upon the number of lines in the P.B.X. group considered.

The objects and features of the invention mentioned above as well as others and the invention itself will be better appreciated from the following description of a preferred embodiment of the invention to be read in conjunction with the accompanying drawing which represents in the form of a diagram a selection system by sequential hunting in accordance with the invention.

By referring to the figure, part of the statistical data storage devices of a multiple register such as described in the U.S. co-pending application S.N. 74,434 (H. Adelaar et al.) and S.N. 125,128 (H. Adelaar et al.) cited above has been represented. These statistical data storage devices essentially comprising a plurality of bistable trigger circuits which successively translate the state of the various rows of a coordinate memory part of the multiple register, this memory being not represented. The statistical data storage devices shown are DNR to store the selection number of the called line, ADR to store the identity of an address of the sequential hunting memory MH, CLR to store the class of the called line, BLR to store the state of the called line and finally ENR to store the equipment number of the called line.

Register REG and more particularly the statistical data storage devices cited above cooperate with the class of line indicator TRA which is also used as a translator, with the sequential hunting equipment HST and finally with the circuit LILI providing information with respect to the state of the subscriber's lines.

Register REG of a telephone exchange and more particularly a compartment of a multiple register having stored information relative to the establishment of a communication, and in particular the selection number of the called line, may regularly store this number during a given time, for instance 120 microseconds, and at a given rhythm, defined for instance by a period of 10.8 milliseconds. Under the control of its logic circuit, and preferably by means of a program register such as described in the Belgian Patent No. 593,909 (F. Clemens—A. Salle), the register will address the class of line indicator TRA during a given statistical data storage time.

The class of line indicator TRA to which reference is already made in the Belgian Patent No. 593,909 (F. Clemens—A. Salle), is essentially a semi-permanent memory of the type described in the U.S. patent application S.N. 845,362 (J. Van Goethem). The actual memory MT comprises a certain number of columns on which, as already mentioned at the beginning of the description, signals will appear or not in order to characterize information corresponding to the row which will have been addressed. The coincidence gate $G_1$ symbolizes the address device of this semi-permanent memory MT. This gate is on the one hand fed by the source of sinusoidal signals V and on the other hand controlled from DNR. In other words, when the logic circuit of the register shall order the examination of TRA, the number of the called line stored in DNR will route the source of sinusoidal signals V towards the row of MT corresponding to the line number stored in DNR. The signals appearing on the various column wires of MT in response to this address will establish in the statistical data storage devices ADT and CLT associated with the semi-permanent memory MT, information corresponding to this line number staticized in DNR. In CLT a code characterizing the class of the called line will be staticized. In case of a line pertaining to a P.B.X. group, the statistical data storage device ADT instead of simply providing the equipment number of the called line (which is required in the case of a call towards a normal line in order to be able to control the unblocking of the electronic gates included in the path leading to this line) will provide an address code for the sequential hunting circuit HST.

The statistical data storage time of 120 microseconds provided for each register word may as described in the patents cited above be divided in 12 elementary time intervals of 10 microseconds each. The first interval is used to read the register memory, i.e. for the establishment of information in the statistical storage devices of the register such as DNR. The twelfth is used to reinscribe the statistical information, which may have been modified during the statistical data storage interval, in the temporary memory of the multiple register. The ten other elementary times are thus available to carry out the different logic operations which may be required. The address of memory MT may be produced during one of these elementary times, preferably at the beginning of the statistical data storage period. During another subsequent elementary time, one may read the information which has been stabilized in ADT and CLT in order to transfer it to the corresponding statistical data storage devices of the register, i.e. respectively ADR and CLR. In other words, gates such as $G_1$ symbolizing the input switch of the semi-permanent memory MT are also controlled by pulses (not shown) defining these elementary times. These various controls to define the exact moment during which a transfer of information is produced, are not indicated on the drawing, the foregoing explanations being sufficient to establish the way in which these transfers of information take place. The transfer of information contained in ADT towards ADR takes however place through OR gates symbolized by $M_1$, because as will be seen further, information coming from the sequential hunting circuit HST may also be impressed on the statistical data storage devices ADR.

At the end of the statistical data storage time, the information inscribed on DNR, ADR and CLR will be reinscribed in the row corresponding to the temporary memory of the register to reappear after 10.8 milliseconds at the following cycle. The program of the logic circuit of the register will then order it to address a row of the memory MH of the sequential hunting circuit HST which is constituted exactly in the same way as TRA. The fact that CLR stores a line class code defining the called line as pertaining to a P.B.X. group, will permit it to authorize coincidence gates symbolized by $G_2$ so that they will permit the transmission of statistical information in ADR towards the input switch symbolized by the coincidence gate $G_3$ of the semi-permanent memory MH. This transmission is carried out through the OR gates symbolized by $M_2$ since as will be seen later, an analogous control may be exercised from the statistical data storage devices BLR instead of CLR.

During this second statistical data storage time, the source of sinusoidal signals V will thus be connected to the row MH which corresponds to the first line of the P.B.X. group defined by the selection number stored in DNR. Corresponding signals will appear on the column wires of MH and will be sent to the statistical data storage devices ENH and ADH of this semi-permanent memory. The statistical data storage devices ENH will register the equipment number of the first line of the requested P.B.X. group, while the statistical data storage devices ADH will register the identity of the ned address of MH which will give the equipment number of the second line of the P.B.X. group. Again, this address of MH will take place during one or more of said elementary times and during a subsequent elementary time, the statistical data storage devices ENH will be read by the statistical data storage devices corresponding to the register, i.e. ENR.

Still during the second statistical data storage time considered, the equipment number of the first P.B.X. line being stored in ENR, the logic circuit of the register will use another elementary time of the statistical data storage interval to send the line equipment number contained in ENR to the circuit LILI. Such a circuit to which reference is made namely in copending application 125,-238 (H. Adelaar et al.) may provide information relative to the state of the called subscriber's line, the identity of which has been signalled by ENR circuit LILI sends signals back to the statistical data storage device BLR of register REG which will indicate if the called line is free or not. This stored information in the statistical data storage devices of register REG will now, at the end of the statistical data storage time, be re-inscribed in the temporary register memory to reappear at the statistical data storage time corresponding to the following cycle of the register, as well as the new address transmitted from ADH to ADR.

During a third statistical data storage time, supposing that BLR registers the fact that the first line of the required P.B.X. group is busy, it will be BLR which will this time authorize a new examination of MH by means of the new address contained in ADR. Care should be taken to prevent the class of the line stored in CLR from unblocking of the gates symbolized by $G_2$, since this control should be performed by BLR indicating that the previously examined line was busy. This change of control may be performed for instance at the end of the preceding statistical data storage time belonging to the communication in question by any appropriate device. This is symbolized by the coincidence gate $G_4$ which sends the information from ADR under the control of BLR towards $G_3$ by passing through $M_2$, while a signal from BLR also controls the coincidence gate $G_2$ by means of the inverter $I_1$. In this way, when BLR authorizes $G_4$, it blocks $G_2$ and vice versa; moreover it is to be noted that if BLR has received from circuit LILI the indication that the first line of the required PBX group is free, BLR will register a condition such that neither $G_2$ nor $G_4$ can authorize the transfer of the address contained in ADR to control the input switch ($G_3$) of MH, as it is no longer necessary to continue the search, the latter being terminated. The statistical data storage device BLR may, for instance, be realized by means of two bistables normally in the 0 condition and the first of which passes to condition 1 when the examined line is busy while the other passes to the condition 1 when the called line is free. If one of these two bistables is in its 1 condition, gate $G_2$ is blocked, i.e. CLR cannot authorige the transfer, but it is only when the first bistable is in its condition 1 that gate $G_4$ is authorized to permit the transfer. During each statistical data storage time, care should of course be taken to put these bistables back to 0 during an elementary time preceding that during which they receive the information from the circuit LILI, if single wire transfer is foreseen.

The sequential hunting may thus be proceeded with in the indicated manner as long as the examined line will be busy. This sequential hunting will be stopped as soon as a free line will be found, the register will then proceed with its working program in order to establish the connection towards the line the equipment number of which is stored in ENR.

When the memory MH shall provide the equipment number of the last line of the called P.B.X. group to ENR instead of providing the address of a new line of the group to ADR, a particular code will be stored in ADR to indicate that the sequential hunting is finished. Hence, if during this statistical data storage time BLR receives the indication that this last line is also busy, the information contained in BLR in conjunction with that provided by ADR will indicate to the register that it has to continue its working program during the statistical data storage times of the following cycles in order to provide busy tone to the calling subscriber.

It is quite evident that the sequential hunting system described above is not necessarily limited to the search for a free line among a group of P.B.X. lines in a telephone system. In a telephone system or a similar communication system, other circumstances may necessitate similar sequential searches which may be accomplished in accordance with the principles established above.

The sequential hunting system described above may for instance be used to hunt for an outgoing telephone junction in function of the prefix of the called member, any free junction having to be selected among a junction group.

The sequential hunting system may still find applications to hunt for other circuits such as the signalling units described in the copending U.S. application S.N. 126,334 filed July 24, 1961 (H. Adelaar et al.) or yet to hunt for intermediate speech storing units which intervene in the electronic telephone system described in the copending U.S. application S.N. 63,203 filed October 17, 1960 (H. Adelaar).

It will be noted that it is not absolutely necessary to limit oneself to the search or the examination of one single line during a statistical data storage time, but for the hunting speeds envisaged the examination of one line per register cycle will generally be sufficient. Preferably, the new address obtained in ADH during a statistical data storage time will only be transfered in ADR at the end of the statistical data storage time to be stored again in the corresponding row of the temporary memory of the register. However, by transferring the line condition in BLR only at the end of the statistical data storage time, to store it again in the temporary memory of the register or by any other appropriate control, one could avoid that two new addresses are effective during a same statistical data storage interval if one limits oneself to a single examination per register cycle.

The semi-permanent memory for the sequential hunting might also be used for various types of sequential searches, e.g. in a small telephone exchange, for sequential searches in a group of P.B.X. lines or in a group of outgoing junctions.

While the principles of the invention have been described above in connection with specific apparatus, it is to be clearly understood that this description is made only by way of example and not as a limitation on the scope of the invention.

We claim:

1. A group hunting selection system comprising groups of similar circuits, control means for hunting over said groups of circuits for a circuit in a desired condition, a memory means having at least temporary storage capacity accessible to said control means, means for causing said control means to sequentially address said memory means responsive to a first code identifying one of said circuits, means responsive to each of said sequential addressings and comprising said memory means for individually reading out second codes for sequentially identifying each of said circuits, means for causing said control means to test each of said circuits for said desired condition when said circuits are identified by said second codes read out of said memory, and means for stopping said read out and said testing when a circuit in said desired condition is found.

2. The system of claim 1 wherein said control means comprises register means and a class of line indicator means, means responsive to the receipt at said register means of a telephone directory code number identifying one circuit in a group of said circuits for causing said indicator means to indicate a group hunting function to said register, and means responsive to said group hunting indication for causing said register to address said memory means.

3. The system of claim 2 and means associated with said memory means for reading out an authorized function code related to the circuit identified by said second code.

4. The system of claim 3 wherein said register comprises a plurality of individual storage compartments, means for storing individual statistical data relative to the call identified by said directory number code in correspondingly individual compartments of said register means, the statistical data stored in each of said compartments characterizing the progress of said call, and means for addressing said memory means during time periods which correspond to said stored statistical data.

5. The system of claim 4 and means for giving said memory storage compartments access to said indicator means.

6. The system of claim 4 and means for subdividing said time periods into a plurality of elementary time periods, and means for performing logic functions required by said call during individual ones of said elementary time periods.

References Cited by the Examiner

UNITED STATES PATENTS

| | | | |
|---|---|---|---|
| 2,965,718 | 12/60 | Avery | 179—18 |
| 3,011,029 | 11/61 | Henning | 179—18 |

ROBERT H. ROSE, *Primary Examiner.*